Figure 1:
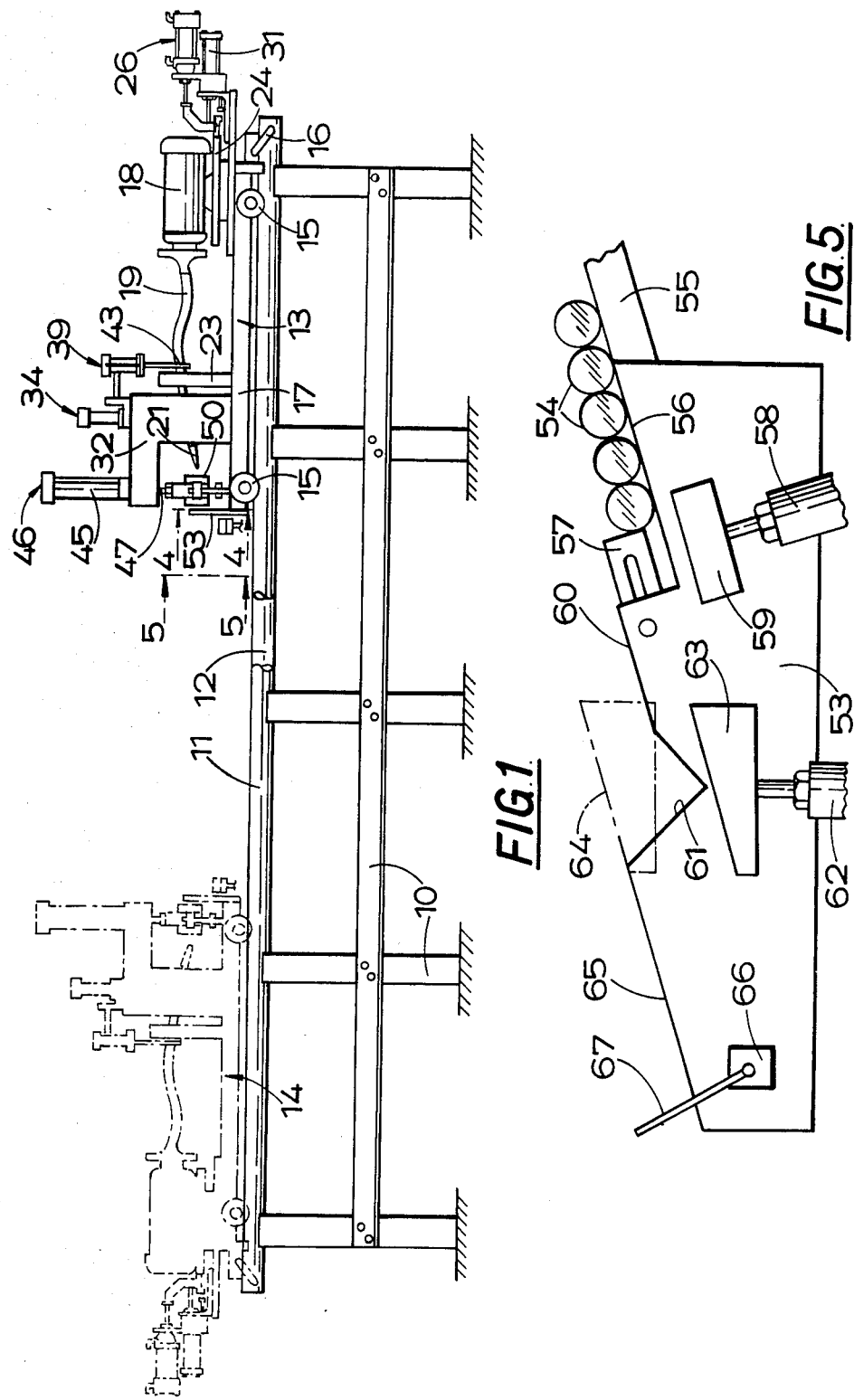

United States Patent [19]

Walker

[11] Patent Number: 4,634,322

[45] Date of Patent: Jan. 6, 1987

[54] ASSEMBLY FOR USE IN REMOVING MATERIAL FROM THE ENDS OF BARS OR THE LIKE WORKPIECES

[76] Inventor: Derek W. R. Walker, Four Gates, Hopstone, Claverley, Wolverhampton, England

[21] Appl. No.: 673,127

[22] Filed: Nov. 19, 1984

[30] Foreign Application Priority Data

Nov. 17, 1983 [GB] United Kingdom ............... 8330710

[51] Int. Cl.⁴ .............................................. B23C 3/12
[52] U.S. Cl. .................................... 409/138; 409/139; 51/33 R
[58] Field of Search ............... 409/138, 139, 140, 178, 409/179, 204; 51/33 R

[56] References Cited

U.S. PATENT DOCUMENTS

| 2,951,425 | 9/1960 | Eger | 409/138 |
| 3,712,174 | 1/1973 | Granfield | 409/179 |

FOREIGN PATENT DOCUMENTS

| 36391 | 3/1977 | Japan | 409/138 |
| 71789 | 6/1977 | Japan | 409/138 |
| 1203651 | 9/1970 | United Kingdom | 409/138 |

Primary Examiner—Gil Weidenfeld
Assistant Examiner—Daniel W. Howell
Attorney, Agent, or Firm—Oldham, Oldham & Weber Co.

[57] ABSTRACT

An assembly capable of use in removing material from both ends of an elongated workpiece, such as a bar incorporates two similar pieces of apparatus of a known kind. Each apparatus has a cutter mounted at one end of a flexible drive and rotatable by a motor about its own axis to effect removal of the material; the cutter is supported in a universal mounting enabling the cutter to swing in a closed path about the axis of the cutter. The cutter is biased inwards towards the axis. The invention provides positioning means for moving the cutters aside into loading positions so that a finished workpiece can be removed laterally and a new one introduced laterally. The positioning means on each apparatus includes means for shifting the motor towards the universal mounting so as to cause the flexible drive to bow more markedly and move the cutter further from the axis, and a deflector for engaging the cutter-end of the flexible drive and moving it to its loading position. Restraining means restrains the bodily rotational movement of the flexible drive to steady the orbiting travel of the cutter.

8 Claims, 5 Drawing Figures ated discharge
ASSEMBLY FOR USE IN REMOVING MATERIAL FROM THE ENDS OF BARS OR THE LIKE WORKPIECES This invention relates to an assembly for use in removing material from the ends of bars or the like workpieces such as rods, wires or tubes. The assembly can be used for removing fraze or for pointing or tapering end portions of the workpieces.

Apparatus for removing material from the end portion of a workpiece is the subject of British Pat. No. 1 203 651 of Derek William Ross Walker, and apparatus incorporating the invention ("the earlier invention") that is the subject of that patent is incorporated in the assembly that is the subject of the present invention. The earlier invention consists in apparatus for removing material from the end portion of a workpiece, comprising a cutting head or a holder for such a head, the head or holder being rotatable by a motor about is own axis so that in use the head can effect removal of the material, the head or holder being supported in a universal mounting enabling it to swing bodily about a point or neighbouring points on the axis of the workpiece and thus to rotate bodily in a closed path around the axis of the workpiece to effect removal of the material, the apparatus including means either to bias the head or holder to or towards the centre of the path or means to constrain the head or holder to follow a predetermined path about the centre.

Apparatus in accordance with the earlier invention is capable of use not only with workpieces of circular cross-section, such as round tubes or rods, but also with workpieces of any other suitable cross-section, such as those of oval, square, hexagonal or other polygonal or irregular cross-section.

That form of apparatus operates very satisfactorily but it has been of universal utility as it has been necessary, when loading a workpiece into a working position in which it can be operated on by the cutting head, to cause relative axial movement between the workpiece and the apparatus.

An aim of the present invention is to provide an assembly incorporating such apparatus and capable of an application for which the apparatus has not previously been employed and for which it has previously been thought unsuitable.

Thus, according to the present invention there is provided an assembly for use in removing material from both the ends of a workpiece of elongated shape, the assembly comprising two pieces of apparatus, each for removing material from an associated end of the workpiece and each comprising a cutting head or a holder for such a head, the head or holder being rotatable by a motor about its own axis so that in use the head can effect removal of the material, the head or holder being supported in a universal mounting enabling it to swing bodily about a point or neighbouring points on the axis of the workpiece and thus to rotate bodily in a closed path around the axis of the workpiece to effect removal of the material, the apparatus including means either to bias the head or holder to or towards the center of the path or means to constrain the head or holder to follow a predetermined path about the center, said pieces of apparatus being disposed or capable of being disposed in a working state in which said cutting heads, or cutting heads held by each of said holders, can remove material from both ends simultaneously of a workpiece mounted between them in a working position, and the assembly also including positioning means operable in use to cause those cutting heads to assume or to be retained in loading positions, the arrangement being such that when the cutting heads are in their loading positions a workpiece can be moved laterally into or out of its working position.

The arrangement is preferably such that when the cutting heads are in their loading positions they are disposed in a predetermined location to one side of the working axis, that is the axis of the workpiece when it is in its working position, so that the workpiece can be moved laterally into or out of its working position along a path that avoids said location.

The positioning means preferably comprises deflecting means, for each cutting head or holder, operative to move in a direction transverse to the working axis so as to cause the associated cutting head or holder to move to a loading position or to be retained in a loading position outside said closed path.

Preferably, in each piece of apparatus the cutting head or holder is driven through a bowed flexible drive from an associated motor, and the cutting head or holder is supported in said universal mounting at a position spaced from the motor, the positioning means being operative to cause relative movement between the motor and the universal mounting so that they become closer together, the extent to which the flexible drive is bowed is therefore increased and the cutting head or holder is thus assisted in assuming a loading position. Preferably the positioning means is also operative subsequently to cause relative movement between the motor and the universal mounting so that they become further apart at a controlled rate so that in use the cutting head approaches a workpiece gradually from a loading position.

The pieces of apparatus are preferably so mounted that the spacing between their cutting heads or holders can be adjusted so as to accommodate workpieces of different lengths.

Preferably there is restraining means operative in use to restrain the bodily rotation of the cutting head in a closed path around the axis of the workpiece. The restraining means preferably comprises a damper coupled to the holder or other part which in use rotates around the axis of the workpiece.

Figure 2:
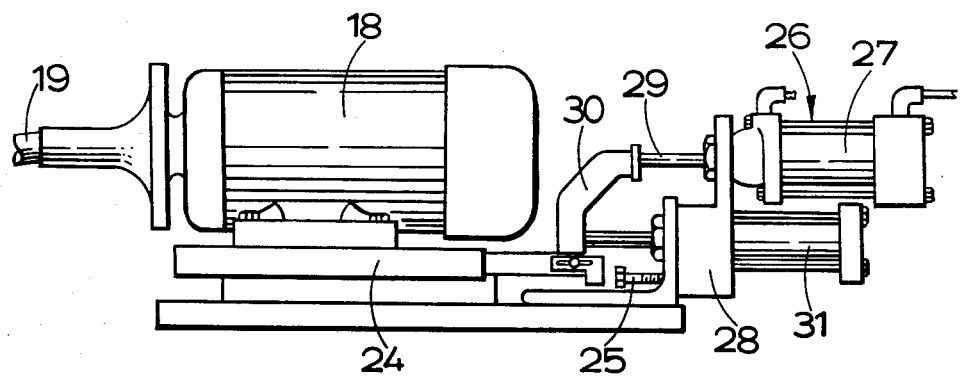
Figure 3:
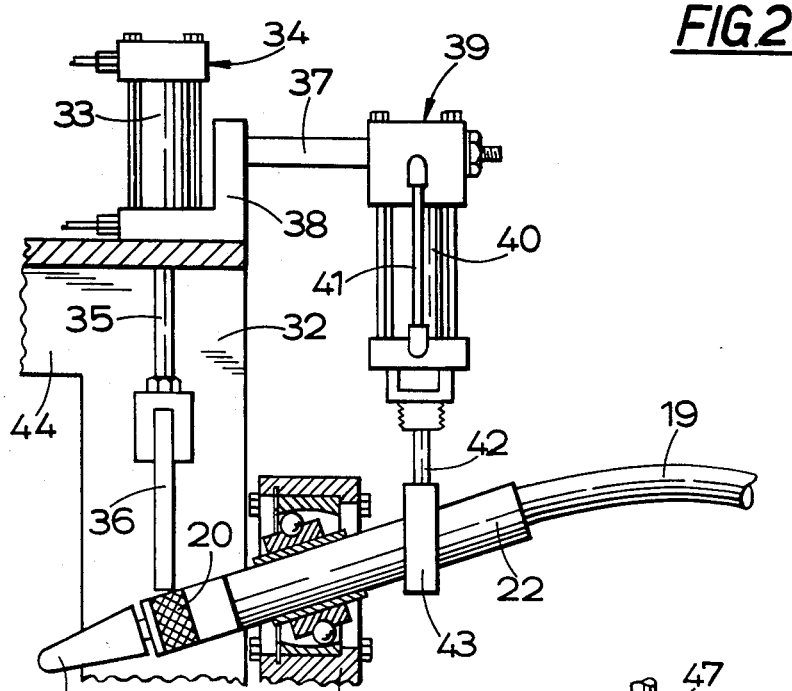
Figure 4:
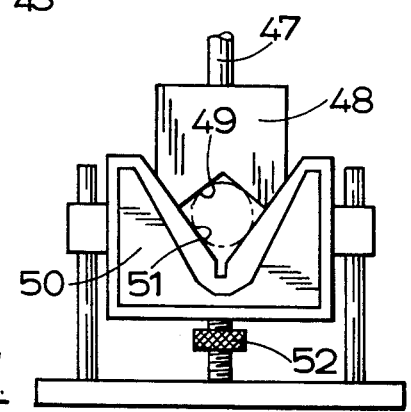

One type of assembly embodying the present invention will now be described in more detail, by way of example, and with reference to the accompanying drawings, in which:

FIG. 1 is a side view of the assembly,

FIG. 2 is a side view of part of the assembly shown in FIG. 1, but to a larger scale, FIG. 3 is a side view of another part of the assembly shown in FIG. 1, also to a larger scale, a portion being broken away to reveal what is behind it, FIG. 4 is a scrap view in the direction of the arrows 4—4 in FIG. 1, again to a larger scale, and FIG. 5 is a scrap view in the direction of the arrows 5—5 in FIG. 1, yet again to a larger scale.

The assembly is intended for removing material from the ends of bars, rods or like workpieces of elongated shape by a machining operation and may be provided with an automatic feed and an automatic discharge device enabling it to handle a plurality of workpieces one after the other without the intervention of an operator.

The assembly includes a stand 10 which carries at the top a pair of horizontal parallel rails 11 and 12 each of which is made from a length of steel tube of circular cross-section. Two wheeled carriages 13 and 14 are mounted on the rails, their wheels 15 being formed with peripheral grooves of arcuate cross-section which receive upper portions of the tubular rails and in this way locate the carriages laterally with respect to the rails. Each of the carriages can be moved along the rails to any desired position and locked in that position with the aid of a manually operable clamp 16 which is mounted on the carriage and can grip the stand. In a modified arrangement (not shown) the carriage 14 is permanently mounted in place so that its position cannot be varied. Each carriage has a horizontal rectangular base 17 which supports mechanism for use in removing material from the ends of workpieces, and, as the mechanism on one carriage 13 is similar to that on the other carriage 14, the mechanism on only one carriage 13 will be described in detail.

The mechanism includes apparatus largely similar to that illustrated in FIG. 3 of the drawings accompanying the complete specification of the aforementioned British Pat. No. 1203651 of Derek William Ross Walker and described in that complete specification. The apparatus comprises a motor 18 mounted near one end of the base 17 of the carriage. The motor 18 would normally be an electric motor, though an air-driven motor could be used is desired. The motor 18 is connected to a flexible drive 19 which extends lengthwise of the carriage and has a rotatable flexible core extending through a non-rotatable flexible tube. That end of the core of the flexible drive further from the motor carries a holder 20 having an axially extending screw-threaded spigot which in use carries a cutting head or cutter 21 provided with a tapped hole complementary to the spigot. In an alternative construction (not illustrated) the holder is in the form of a chuck. The cutter 21 may be made from any suitable material such as tungsten carbide and may be of any suitable overall shape, such as cylindrical or conical, a conical cutter being illustrated. An end portion of the flexible drive adjacent to the holder extends through a rigid, tubular sleeve 22. A central part of the sleeve is mounted in a spherical bearing assembly 23 which permits rotation of the sleeve about its own axis and also permits universal movement of the sleeve about the center of the bearing assembly. The bearing assembly 23 is fixed to the base 17 near that end of the carriage 13 remote from the motor. The apparatus is so disposed that the axis of rotation of the motor 18 extends through the center of the bearing assembly 23 and is parallel with the rails 11 and 12 of the stand. That axis is hereinafter referred to as the main axis of the apparatus.

The motor 18 is mounted on a slide 24 on the base of the carriage 13 so that it can be moved to and fro, lengthwise of the carriage, through a relatively short distance. The rearward travel of the motor, that is the travel in a direction away from the bearing assembly 23 is limited by an adjustable stop 25. Movement of the motor 18 is effected by a pneumatic piston-and-cylinder unit 26 of which the cylinder 27 is fixed to a bracket 28, secured to the base of the carriage, and the piston rod 29 is fixed to a bracket 30 secured to the slide. A damper 31 is provided in parallel with the piston-and-cylinder unit 26 so as to control the rate at which the motor moves. The damper 31 comprises an hydraulic piston-and-cylinder unit of which the cylinder is secured to the bracket 28 and the piston rod is secured to the bracket 30. When the motor 18 is in its forward position, that is its end position nearest to the bearing assembly 23, that part of the flexible drive 19 between the motor and the bearing is markedly bowed so that the cutter 21 is spaced well aside from the main axis. When the motor is in its rearward position, that is its end position furthest from the bearing assembly, that part of the flexible drive is less bowed than before so that the cutter is brought closer to the main axis. The slide, stops and piston-and-cylinder unit all constitute part of the positioning means referred to above.

In a modified arrangement, which is not illustrated, the piston-and-cylinder 26 and the damper 31 are disposed to one side of the carriage 13 rather than to the rear of the carriage.

A bridge 32 is mounted on the base 17 of the carriage and extends above that part of the sleeve 22 between the bearing assembly 23 and the cutter 21. The cylinder 33 of a pneumatic piston-and-cylinder unit 34 is mounted on the bridge 32, vertically above the sleeve 22, and the piston rod 35 of that unit extends vertically downwards carrying at its lower end a deflector plate 36. The unit 34 can raise the deflector plate 36 to a working position, in which it is clear of the sleeve 22, and can lower the plate to a deflecting position (as shown in FIG. 3) such that the cutter 21 is moved downwards to a loading position spaced well below the main axis. The arrangement is such that in normal use the deflector plate 36 is lowered only when the motor is in its forward position. The piston-and-cylinder unit 34 and the deflector plate 36 constitute deflecting means, as referred to above, the deflecting means in turn constituting part of the positioning means.

A horizontal pivot rod 37 extends rearwards from a bracket 38 on the top of the bridge. A pneumatic piston-and-cylinder unit 39—a restrainer unit—is supported on the pivot rod 37, the upper end of the cylinder 40 of the unit being pivotally connected to a rear end position of the pivot rod. The two ends of the cylinder 40 are interconnected by an external air duct 41 in which there is an adjustable restrictor. The piston rod 42 of the restrainer unit extends downwards and carries at its lower end a universal bearing 43 through which the sleeve 22 on the flexible drive 19 extends. The universal bearing 43 is parallel to the spherical bearing assembly 23 described above and is spaced a little to the rear thereof. The restrainer unit 39 and bearing 43 together constitute a restrainer.

A forward extension 44, of inverted channel shape, extends forwards from the top of the bridge 32, over the cutter 21 and a little beyond it. At its forward end the extension carries the cylinder 45 of another pneumatic piston-and-cylinder unit 46 (as shown in FIG. 1). The piston rod 47 of the unit 46 extends vertically downwards and carries at its lower end a locating plate 48 (see FIG. 4) of which the lower edge is formed with a locating slot 49 in the shape of an inverted letter V. The locating plate 48 can be lowered between a pair of parallel carrier plates 50 each of which has an upper edge formed with a V-shaped locating slot 51. The carrier plates 50 are mounted close to the front end of the base 17 of the carriage 13 and their vertical position can be adjusted by means of a screw mechanism 52. When relatively long workpieces are to be machined it may be desirable to mount an additional carrier plate or additional carrier plates at one or more locations between the carriages 13 and 14 and spaced from those carriages, so as to prevent a workpiece that is in a working position from sagging.

A guide plate 53 (see FIG. 5) is mounted on the forward end of the base 17 of the carriage 13. Its upper edge is shaped to afford ramps for guiding workpieces gravitationally. In use, workpieces 54 roll and one by one from a stand 55, disposed to one side of the assembly, and onto the guide plates 53 of the two pieces of apparatus, end portions of the workpieces resting on the upper edges of the plates. The leading workpiece first rolls down an input ramp 56 on each guide plate until it reaches a stop 57, the position of which can be adjusted as required. Beneath the level of each input ramp is disposed a first lifting device comprising a pneumatically operated piston-and-cylinder unit 58 of which the piston rod extends upwards and carries at its upper end a first lifting plate 59. When the unit 58 operates to raise the first lifting plate 59 the adjacent end portion of the leading workpiece is raised above the stop so that the workpiece can roll down a feed ramp 60 on the guide plate and lodge in the V-shaped locating slot 51 of the adjacent carrier plates 50, the upper edge of the guide plate being formed with a similarly shaped slot 61. A second lifting device, 62, similar to the first, is positioned below the slot 61 so that when its lifting plate 63 is raised to the position indicated by the chain-dotted lines 64 it lifts the adjacent end portion of the workpiece from the carrier plates 50 and lets the workpiece roll down a discharge ramp 65 on the guide plate. Near the lower end of the discharge ramp of one of the guide plates is a starting switch 66 with an upstanding operating arm 67 which normally projects above the upper edge of the associated guide plate 53.

In use the motors 18 of the mechanisms operate continuously to rotate the cutters 21. Immediately before the start of a cycle of operation the assembly is in the following state. The motors 18 are in their forward positions, the deflector plates 36 are in their deflecting positions, the cutters are consequently in their loading positions, spaced well below the main axis of the assembly, the locating plates 48 are in raised positions and the first lifting plates 59 and the second lifting plates 63 are in lowered or retracted positions below the upper edges of their associated guide plates 53.

A cycle of operation of the assembly is initiated by depression of the arm 67 of the starting switch 66. This is effected by a finished, machined workpiece rolling down the discharge ramps 65 of the guide plates 53. On operation of the starting switch 66 the first lifting devices operate to raise a first workpiece over the stops 57 and allow its end portions to roll down into the locating slots 51 of the carrier plates 50. The workpiece thus moves laterally into its working position along a path that avoids the locations occupied by the cutting heads 21. The lifting plates 59 of the first lifting devices 58 are then lowered to allow the next workpiece to roll down the input ramp to the stops 57. After a delay sufficient to allow the first of the workpieces 54 to come to rest on the carrier plates 50 the locating plates 48 are lowered to grip the workpiece firmly in a working position, the carrier plates having been initially adjusted to cause the axis of the workpiece (that is the working axis) to be co-axial with the main axis of the assembly when the workpiece is in its working position. The delay in lowering the locating plates 48 is brought about by pneumatically-operated timers (not shown) disposed in air-lines to the cylinders of the units 46 operating the locating plates. The deflector plates 36 are then raised to their working positions and the motors 18 are moved back to their rearward positions under the control of the dampers 31, thereby causing the cutters 21 gradually to approach the ends of the workpiece, and the assembly to assume its working state. If the dampers 31 were not present or were wrongly adjusted so as to allow the cutters 21 to approach the workpiece too rapidly there would be the danger that the cutters might be chipped. As before, the delay in the operation of the piston-and-cylinder units 34 for moving the deflector plates 36 is brought about by the provision of suitably adjusted timers (not shown) in air-lines to those units. Upward movement of each deflector plate 36 to its working position operates an associated air-valve (not shown) in an air supply line to the piston-and-cylinder unit 26 for moving the slide 24 carrying the associated motor 18, so as to ensure that the cutters 21 do not approach the workpiece and start their operations before the workpiece is clamped in position by the locating plates 48 and the deflector plates 36 are in their working positions.

While one particular arrangement for causing the components of the assembly to operate in the desired sequence has been described, it is to be understood that other arrangements may be used if desired. One such arrangement incorporates timing devices which enable operations to occur at predetermined times after other operations. A preferred arrangement, however, involves the use of sensors which detect the completion of each stage, such as the movement of a component to a particular position, and trigger the initiation of the next stage. In this way each operation or stage is triggered by the completion of the previous stage.

The operation of the cutters 21 in removing material from the ends of the workpieces is largely similar to that described in the complete specification of the aforementioned British Pat. No. 1 203 651, the cutters rotating relatively rapidly about their own axes and at the same time orbiting more slowly about the main axis of the assembly. It has been found that if the orbital movement of a cutter is unconstrained there is sometimes a tendency for the cutter to perform its orbital movement too rapidly so that the cutter rolls over the surface of the workpiece and the engagement between the cutter and the workpiece somewhat resembles the engagement between mating gears. In order to restrain the orbital movement there is provided the restrainer described above. The restrainer serves to prevent any rapid upward and downward movement of the rigid sleeve 22 and of the cutter 21. This is found to be all that is necessary to prevent the undesired rapid orbital movement of the cutter. The extent of the restraint can be varied as may be found desirable by ajustment of the restrictor.

This idea of restraining the rapid orbital movement of the cutter is of general application and may, if desired, be applied to apparatus of the kind described in the aforementioned complete specification. The restraint may be applied by any suitable means.

After a predetermined period of time, sufficient to enable the desired amount of material to be removed from the ends of the workpieces, the slides 24 with the motors 18 move to their forward positions, the deflector plates 36 move to their deflecting positions, the locating plates 48 are raised and the second lifting devices 62 operate to raise the end portions of the workpiece from the carrier plates 50 and allow the machined workpiece to roll down the discharge ramps 65 and to deflect the operating arm 67 of the starting switch 66 again so as to start the next cycle. If desired there may be an additional switch (not shown) operated by a workpiece abutting the stops 57, the arrangement being such that the cycle of operation is prevented from occurring if there are no more workpieces to be machined and the additional switch is not operated.

It is to be understood that the assembly can be used to remove material from the ends of workpieces of any suitable cross-section, such as those of square or hexagonal cross-section, and not only those of circular cross-section.

What is claimed is:

1. An assembly for use in removing material from both ends of a workpiece of elongated shape, the assembly comprising two pieces of apparatus, each operative to remove material from an associated end of a workpiece and each comprising cutter holding means rotatable about a cutter axis, a motor operative to rotate said cutter holding means about said cutter axis, so that in use a cutter held by the cutter holding means can effect removal of material from the workpiece, a universal mounting for the cutter holding means enabling the cutter holding means to swing bodily about at least one point on a workpiece axis and thus in use to rotate bodily in a closed path of appropriate configuration around said workpiece axis to effect removal of said material, and guiding means operative in use to urge the cutter to follow said closed path, said two pieces of apparatus being capable of being disposed in a working state in which cutters held by said cutter holding means can remove material from both ends simultaneously of a workpiece of elongated shape mounted between them in a working position, and the assembly also including positioning means operable in use to cause those cutter heads to assume loading positions such that in use when the cutters are in their loading position a workpiece can be moved laterally into or out of its working position, the positioning means comprising deflecting means, associated with each of the cutter holding means and operative in use to move in a direction transverse to said working axis so as to cause the cutter to move to or to be retained in a predetermined loading position outside said closed path.

2. An assembly according to claim 1 in which, in each piece of apparatus includes a bowed flexible drive connected between the cutter holding means and the associated motor, and the cutter holding means is supported in said universal mounting at a position spaced from the motor, the positioning means also being operative to cause relative movement between the motor and the universal mounting so that they become closer together, and the extent to which the flexible drive is bowed is therefore increased and a cutter held by the cutter holding means is thus assisted in assuming a loading position.

3. An assembly according to claim 2 in which the positioning means also incorporates a damping device operative to restrain relative movement between each motor and the associated universal mounting when they become further apart, whereby the movement occurs at a controlled rate so that in use the associated cutter approaches a workpiece gradually from a loading position.

4. An assembly according to claim 1 in which the pieces of apparatus are so mounted that the spacing between their cutter holding means can be adjusted so as to enable the assembly to accommodate workpieces of different lengths.

5. An assembly according to claim 1 in which there is restraining means associated with each operative in use to restrain the bodily rotation of the cutter holding means in its closed path around the axis of the workpiece.

6. An assembly according to claim 5 in which the restraining means comprises a reciprocable damper so coupled as to become operative when the cutter holding means rotates around the axis of the workpiece.

7. An assembly for use in removing material from at least one end of a workpiece of elongated shape comprising at least one piece of apparatus operative to remove material from an associated end of a workpiece comprising cutter holding means rotatable about a cutter axis so that in use a cutter held by the cutter holding means can effect removal of material from the workpiece, a universal mounting for the cutter holding means enabling the cutter holding means to swing bodily about at least one point on a workpiece axis and thus to rotate bodily in a closed path of appropriate configuration around said workpiece axis to effect removal of said material, and guiding means operative in use to urge the cutter to follow said closed path, wherein when said assembly comprises two pieces of apparatus, both said pieces are capable of being disposed in a working state in which cutters held by said cutter holding means can remove material from both ends simultaneously of a workpiece of elongated shape mounted between them in a working position, and wherein there is restraining means associated with each operative in use to restrain the bodily rotation of the cutter holding means in its closed path around the axis of the workpiece.

8. An assembly according to claim 7 in which the restraining means comprises a reciprocal damper so coupled as to become operative when the cutter holding means rotates around the center of the workpiece.

* * * * *